(12) United States Patent
Bantukul et al.

(10) Patent No.: US 7,742,421 B2
(45) Date of Patent: Jun. 22, 2010

(54) SYSTEMS, METHODS, AND COMPUTER PROGRAM PRODUCTS FOR DISTRIBUTING APPLICATION OR HIGHER LAYER COMMUNICATIONS NETWORK SIGNALING ENTITY OPERATIONAL STATUS INFORMATION AMONG SESSION INITIATION PROTOCOL (SIP) ENTITIES

(75) Inventors: Apirux Bantukul, Cary, NC (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 135 days.

(21) Appl. No.: 12/183,406

(22) Filed: Jul. 31, 2008

(65) Prior Publication Data

US 2009/0040923 A1  Feb. 12, 2009

Related U.S. Application Data

(60) Provisional application No. 60/962,741, filed on Jul. 31, 2007.

(51) Int. Cl.
*H04L 12/26* (2006.01)

(52) U.S. Cl. ............ 370/236.1; 370/230; 370/352

(58) Field of Classification Search ........... 370/230, 370/236, 236.1, 236.2, 241, 241.1, 252, 352, 370/401

See application file for complete search history.

(56) References Cited

U.S. PATENT DOCUMENTS

| | | | |
|---|---|---|---|
| 5,371,852 A | 12/1994 | Attanasio et al. |
| 5,710,885 A | 1/1998 | Bondi |
| 5,719,861 A | 2/1998 | Okanoue |
| 5,870,455 A | 2/1999 | Campbell et al. |
| 5,937,343 A | 8/1999 | Leung |
| 6,058,116 A | 5/2000 | Hiscock et al. |
| 6,088,721 A | 7/2000 | Lin et al. |

(Continued)

FOREIGN PATENT DOCUMENTS

JP  2006-279805 A  10/2006

(Continued)

OTHER PUBLICATIONS

Notification of Transmittal of the International Search Report and the Written Opinion of the International Searching Authority, or the Declaration for International Application No. PCT/US2008/071718 (Jan. 28, 2009).

(Continued)

*Primary Examiner*—Brian D Nguyen
(74) *Attorney, Agent, or Firm*—Jenkins, Wilson, Taylor & Hunt, P.A.

(57) ABSTRACT

Systems, methods, and computer program products for distributing application or higher layer communications network signaling entity operational status information among SIP entities are disclosed. According to one aspect, a method includes determining operational status information for an application or higher layer communications network signaling entity. Further, the method includes identifying at least one second SIP entity to receive the operational status information. The method also includes distributing the operational status information to the at least one second SIP entity. The first SIP entity, the at least one second SIP entity, and the application or higher layer communications network signaling entity are associated with network nodes separate from subscriber communication terminals.

25 Claims, 11 Drawing Sheets

U.S. PATENT DOCUMENTS

| | | | |
|---|---|---|---|
| 6,105,034 | A | 8/2000 | Buckler |
| 6,331,983 | B1 | 12/2001 | Haggerty et al. |
| 6,366,577 | B1 | 4/2002 | Donovan |
| 6,385,198 | B1 | 5/2002 | Ofek et al. |
| 6,404,746 | B1 | 6/2002 | Cave et al. |
| 6,421,674 | B1 | 7/2002 | Yoakum et al. |
| 6,434,143 | B1 | 8/2002 | Donovan |
| 6,446,127 | B1 | 9/2002 | Schuster et al. |
| 6,564,261 | B1 | 5/2003 | Gudjonsson et al. |
| 6,601,099 | B1 | 7/2003 | Corneliussen |
| 6,615,236 | B2 | 9/2003 | Donovan et al. |
| 6,625,141 | B1 | 9/2003 | Glitho et al. |
| 6,636,596 | B1 | 10/2003 | Gallant et al. |
| 6,650,901 | B1 | 11/2003 | Schuster et al. |
| 6,665,702 | B1 | 12/2003 | Zisapel et al. |
| 6,728,748 | B1 | 4/2004 | Mangipudi et al. |
| 6,735,291 | B1 | 5/2004 | Schmid et al. |
| 6,738,390 | B1 | 5/2004 | Xu et al. |
| 6,757,732 | B1 | 6/2004 | Sollee et al. |
| 6,779,039 | B1 | 8/2004 | Bommareddy et al. |
| 6,839,752 | B1 | 1/2005 | Miller et al. |
| 6,857,021 | B1 | 2/2005 | Schuster et al. |
| 6,914,900 | B1 | 7/2005 | Komatsu et al. |
| 6,937,563 | B2 | 8/2005 | Preston et al. |
| 6,992,994 | B2 | 1/2006 | Das et al. |
| 7,020,707 | B2 | 3/2006 | Sternagle |
| 7,028,092 | B2 | 4/2006 | MeLampy et al. |
| 7,054,272 | B1 | 5/2006 | Noel et al. |
| 7,134,011 | B2 | 11/2006 | Fung |
| 7,286,521 | B1 | 10/2007 | Jackson et al. |
| 7,308,499 | B2 | 12/2007 | Chavez |
| 7,631,093 | B2 | 12/2009 | Sternagle |
| 2001/0021173 | A1 | 9/2001 | Oohashi et al. |
| 2001/0039585 | A1 | 11/2001 | Primak et al. |
| 2002/0075844 | A1 | 6/2002 | Hagen |
| 2002/0075880 | A1 | 6/2002 | Dolinar et al. |
| 2002/0080807 | A1 | 6/2002 | Lind |
| 2002/0110113 | A1 | 8/2002 | Wengrovitz |
| 2002/0145975 | A1 | 10/2002 | MeLampy et al. |
| 2002/0176404 | A1 | 11/2002 | Girard |
| 2003/0086410 | A1* | 5/2003 | Eikkula ............ 370/352 |
| 2004/0088424 | A1 | 5/2004 | Park et al. |
| 2004/0114744 | A1* | 6/2004 | Trossen ............ 379/201.01 |
| 2004/0158606 | A1 | 8/2004 | Tsai |
| 2004/0205190 | A1 | 10/2004 | Chong et al. |
| 2004/0221061 | A1 | 11/2004 | Chavez |
| 2005/0147087 | A1 | 7/2005 | Sternagle |
| 2005/0157707 | A1 | 7/2005 | Sternagle |
| 2005/0207402 | A1 | 9/2005 | Kobayashi et al. |
| 2005/0227685 | A1* | 10/2005 | Costa Requena et al. .... 455/423 |
| 2006/0010321 | A1* | 1/2006 | Nakamura et al. ......... 713/168 |
| 2006/0069776 | A1 | 3/2006 | Shim et al. |
| 2006/0101143 | A1 | 5/2006 | Garcia et al. |
| 2007/0156909 | A1* | 7/2007 | Osborn et al. ............. 709/227 |
| 2007/0191004 | A1 | 8/2007 | Yamakawa et al. |
| 2008/0056234 | A1 | 3/2008 | Sprague |
| 2008/0280623 | A1 | 11/2008 | Danne et al. |
| 2009/0268723 | A1* | 10/2009 | Przybysz ............. 370/352 |

FOREIGN PATENT DOCUMENTS

| | | |
|---|---|---|
| KR | 10-2004-0057858 A | 7/2004 |
| KR | 10-2005-0002335 A | 1/2005 |
| KR | 10-2006-0025869 A | 3/2006 |
| WO | WO 00/69140 | 11/2000 |
| WO | WO 01/13228 A2 | 2/2001 |
| WO | WO 02/97653 A1 | 2/2002 |
| WO | WO 2008/019056 A2 | 2/2008 |
| WO | WO 2009/018418 A2 | 2/2009 |

OTHER PUBLICATIONS

Official Action for U.S. Appl. No. 11/510,284 (Dec. 24, 2008).
Final Official Action for Divisional U.S. Appl. No. 11/065,900 (Apr. 20, 2009).
Final Official Action for Divisional U.S. Appl. No. 11/065,876 (Mar. 2, 2009).
Official Action for U.S. Appl. No. 11/065,876 (May 30, 2008).
Interview Summary for U.S. Appl. No. 11/065,876 (Apr. 11, 2008).
Interview Summary for U.S. Appl. No. 11/065,900 (Apr. 1, 2008).
Notification of Transmittal of the International Search Report and the Written Opinion of the International Searching Authority, or the Declaration for International Application No. PCT/US07/17329 (Feb. 15, 2008).
Official Action for U.S. Appl. No. 11/065,876 (Nov. 16, 2007).
Official Action for U.S. Appl. No. 11/065,900 (Oct. 31, 2007).
Official Action for European Application No. 02 734 585.9-2413 (Aug. 29, 2007).
Supplementary European Search Report for European Application No. 02734585.9-2413 (Jun. 11, 2007).
Office Action for U.S. Appl. No. 11/065,876 (Feb. 8, 2007).
Notice of Allowance and Fee(s) Due for U.S. Appl. No. 09/867,879 (Jan. 3, 2006).
Official Action for U.S. Appl. No. 09/867,879 (Jun. 17, 2005).
Restriction and/or Election Requirement for U.S. Appl. No. 09/867,879 (Dec. 15, 2004).
Rosenberg, "SIP Proxies," www.dynamicsoft.com, pp. 1-30 (Jul. 2000).
Wiesmann et al., "Understanding Replication in Databases and Distributed Systems," IEEE, pp. 464-474 (Apr. 10, 2000).
Wang et al., "A Signaling System Using Lightweight Call Sessions," IEEE, pp. 697-706 (Mar. 26, 2000).
Gribble et al., "The MultiSpace: an Evolutionary Platform for Infrastructural Services," The University of California at Berkeley, pp. 157-170 (Jun. 6, 1999).
Handley et al., "SIP: Session Initiation Protocol," IETF RFC 2543, p. 1-153, (Mar. 1999).
Handley et al., "SDP: Session Description Protocol," IETF RFC 2327, p. 1-42, (Apr. 1998).
S. Paul et al., "Reliable Multicast Transport Protocol (RMTP)," IEEE Journal on Selected Areas in Communications, vol. 15, No. 3, p. 407-421, (Apr. 1997).
Lin et al., "A Reliable Multicast Transport Protocol," IEEE INFOCOM, p. 1414-1424, (1996).
A. B. Roach, "Session Initiation Protocol (SIP)—Specific Event Notification," dynamicsoft, Network Working Group, pp. 1-38 (Jun. 2002).
Final Official Action for U.S. Appl. No. 11/510,284 (Jul. 9, 2009).
Official Action for Divisional U.S. Appl. No. 11/065,900 (Oct. 14, 2009).
Notice of Allowance for Divisional U.S. Appl. No. 11/065,876 (Sep. 9, 2009).
Interview Summary for Divisional U.S. Appl. No. 11/065,900 (Sep. 4, 2009).
Office Action for U.S. Appl. No. 11/065,900 (Aug. 5, 2008).
Official Action for U.S. Appl. No. 11/510,284 (Feb. 23, 2010).
"Link Aggregation," IEEE Standard for Local and Metropolitan Area Networks, IEEE Std. 802.1AX, pp. 1-163 (Nov. 3, 2008).
European Search Report for European application No. 02734585.9 (May 23, 2007).
Notification of Transmittal of The International Search Report or the Declaration for International Application No. PCT/US02/16915 (Sep. 5, 2002).

* cited by examiner

SYSTEMS, METHODS, AND COMPUTER PROGRAM PRODUCTS FOR DISTRIBUTING APPLICATION OR HIGHER LAYER COMMUNICATIONS NETWORK SIGNALING ENTITY OPERATIONAL STATUS INFORMATION AMONG SESSION INITIATION PROTOCOL (SIP) ENTITIES

RELATED APPLICATIONS

This application claims the benefit claims the benefit of U.S. Provisional Patent Application Ser. No. 60/962,741, filed Jul. 31, 2007, the disclosure of which is incorporated herein by reference in its entirety.

TECHNICAL FIELD

The subject matter described herein relates to management of message traffic distribution and processing among a plurality of network nodes. More particularly, the subject matter described herein relates to methods, systems, and computer program products for distributing application or higher layer communications network signaling entity operational status information among SIP entities.

BACKGROUND

SIP entities, such as SIP redirect servers, SIP proxy servers, and IP multimedia subsystem (IMS) entities, communicate using the SIP protocol. SIP entities can be used to establish communications sessions between users in networks that use the SIP protocol. One example of a network that uses the SIP protocol is an IMS network. IMS network is a network through which multimedia communications can be established between users and between users and applications. In the IMS network, SIP is the signaling protocol used to establish communication sessions. The entities involved in establishing a communication session in an IMS network include call session control functions (CSCFs) that communicate with each other using the SIP protocol.

One problem with the conventional call setup scenarios with SIP entities, including SIP entities in an IMS network, occurs when a call session control function becomes unavailable. When an originating call session control function receives a request to establish a communication, the originating call session control function may attempt to contact a terminating call session control function associated with the called party. If the terminating call session control function is unavailable, the originating call session control function may be required to wait for a timeout period defined by the SIP protocol before attempting to contact an alternate call session control function. The originating call session control function typically does not store operational status information for other call session control functions with which it communicates. As a result, when a second communication setup request arrives at the originating call session control function, the originating call session control function may again attempt to contact the failed call session control function. Repeated attempts to contact a failed call session control function and the associated time out periods waste resources of the originating call session control function and delay call establishment.

Commonly-assigned, co-pending U.S. patent application Ser. No. 11/510,284, filed on Aug. 25, 2006, the disclosure of which is incorporated herein by reference in its entirety, discloses methods and systems by which a SIP server can obtain and store operational status information for a terminating SIP server to avoid at least some of the aforementioned problems. However, neither SIP nor IMS provides a mechanism for distributing SIP operational status information among SIP servers or IMS nodes. As a result, in order to obtain Application or higher layer communications network signaling entity operational status, each SIP originating server would be required to test the operational status of each terminating SIP server using the methods and systems described in the referenced patent application.

The problem of obtaining and distributing operational status information among SIP entities is not limited to obtaining and distributing operational status information regarding SIP servers. For example, it may be desirable to obtain and distribute operational status information regarding other application and higher layer entities, such as presence applications and ENUM applications, among SIP entities. Using current methods, each SIP entity that desires or needs to communicate with an application or higher layer communications network signaling entity would be required to individually test each application or higher layer communications network signaling entity to determine its operational status, resulting in wasting of SIP node resources and network bandwidth.

Accordingly, in light of these difficulties, there exists a need for improved methods, systems, and computer program products for distributing application or higher layer communications network signaling entity operational status information among SIP entities.

SUMMARY

According to one aspect, the subject matter described herein includes a method for distributing application or higher layer communications network signaling entity operational status information among SIP entities. The method includes determining, at a first entity separate from an application or higher layer communications network signaling entity, operational status information regarding the application or higher layer communications network signaling entity. Further, the method includes identifying, at the first SIP entity, at least one SIP entity to receive the operational status information. The method also includes distributing, from the first SIP entity, the operational status information to the at least one second SIP entity. The first SIP entity, the at least one second SIP entity, and the application or higher layer communications network signaling entity are associated with network nodes separate from subscriber communication terminals, such as phones.

According to yet another aspect, the subject matter described herein includes a method for distributing application or higher layer communications network signaling entity operational status information among SIP entities. The method includes, at a SIP entity entities, determining operational status information for itself. Further, the method includes maintaining, at the SIP entity, a list of other SIP entities subscribed to receive operational status information regarding the SIP entity. Further, the method includes distributing, from the SIP entity, the operational status information determined by the SIP entity to the other SIP entities using the list. The SIP entities are associated with network nodes separate from subscriber communication terminals.

According to yet another aspect, the subject matter described herein includes a system for distributing application or higher layer communications network signaling entity operational status information among SIP entities. The system includes an application or higher layer communications network signaling entity having an operational status. Further, the system includes a first SIP entity separate from the application or higher layer communications network signaling entity and configured to communicate with the application or higher layer communications network signaling entity. The first SIP entity is operable to determine operational status information for the application or higher layer communications network signaling entity. The first SIP entity is also operable to identify at least one second SIP entity to receive the operational status information. Further, the first SIP entity is operable to distribute the operational status information to at least one second SIP entity. The first SIP entity, the at least one second SIP entity, and the application or higher layer communications network signaling entity are associated with network nodes separate from subscriber communication terminals.

According to yet another aspect, the subject matter described herein includes a system for distributing application or higher layer communications network signaling entity operational status information. The system includes a plurality of SIP entities. At least one of the SIP entities is operable to determine operational status information regarding itself and to maintain a list of other SIP entities of the plurality of SIP entities subscribed to receive operational status information regarding the at least one SIP entity. Further, the at least SIP entity is operable to distribute the operational status information regarding the at least one SIP entity to the other SIP entities using the list. The SIP entities are associated with network nodes separate from subscriber communication terminals.

The subject matter described herein for distributing SIP server status information may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer perform steps. Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

As used herein, the term "available application or higher layer communications network signaling entity" refers to an application or higher layer communications network signaling entity with sufficient operating capacity to accept and process new messages. As used herein, the term "unavailable application or higher layer communications network signaling entity" refers to an application or higher layer communications network signaling entity that has either failed or has entered a processing overload state and consequently is not capable of accepting and processing a new message.

As used herein, the term "normal status" refers to the operating status of an available application or higher layer communications network signaling entity.

As used herein, the term "congested status" refers to the operating status of an unavailable application or higher layer entity that, while operational, does not have sufficient internal resources to accept and process a new message.

As used herein, the term "failed status" refers to the operating status of an unavailable application or higher layer communications network signaling entity that has failed to properly receive, process, and provide a valid status response in response to a received message.

As used herein, the term "S-CSCF" refers to an IMS serving call session control function. The S-CSCF function may maintain a list of registered user equipment, associated status information, and associated capabilities.

As used herein, the term "I-CSCF" refers to an IMS interrogating call session control function. The I-CSCF function may provide a terminating subscriber location function for a message received from a P-CSCF server and forward the received message to either an S-CSCF server in the network or to a message server in an adjacent network through a network interconnect function.

As used herein, the term "P-CSCF" refers to an IMS proxy call session control function. The P-CSCF function may process a message received from a SIP device and forward the processed message to an I-CSCF server in the network. Processing the message may include compressing and/or encrypting the received message.

As used herein, the term "CSCF" refers to an IMS call session control function that implements any one or more of the above referenced S-CSCF, I-CSCF, or P-CSCF functions.

As used herein, the term "originating SIP entity" refers to any SIP entity capable of performing a session origination function. An originating SIP server may be an S-CSCF, an I-CSCF, or a P-CSCF.

As used herein, the term "SIP entity" refers to any entity that communicates using the SIP protocol. Examples of SIP entities include an S-CSCF, an I-CSCF, or a P-CSCF. Further, a SIP entity may be an IMS node, an NGN node, a softswitch, a media gateway controller, a SIP proxy server, or a SIP redirect server. A SIP entity may be a SIP network management proxy server.

As used herein, the term "application or higher layer communications network signaling entity" refers to any hardware, software, and/or firmware implemented entity that performs a signaling function in a communications network and that operates at the open systems interconnect (OSI) application layer or higher. Examples of application or higher layer communications network signaling entities suitable for use with the present subject matter include an Internet protocol (IP) multimedia subsystem (IMS) entity, a next generation network (NGN) entity, a softswitch, a media gateway controller, a presence server, and an ENUM server.

As stated above, the application or higher layer communications network signaling entity regarding which operational status is collected and the SIP entities among which the operational status information is distributed are implemented on network nodes separate from subscriber communications terminals, such as SIP phones.

BRIEF DESCRIPTION OF THE DRAWINGS

Preferred embodiments of the subject matter described herein will now be explained with reference to the accompanying drawings of which.

DETAILED DESCRIPTION

Figure 1:
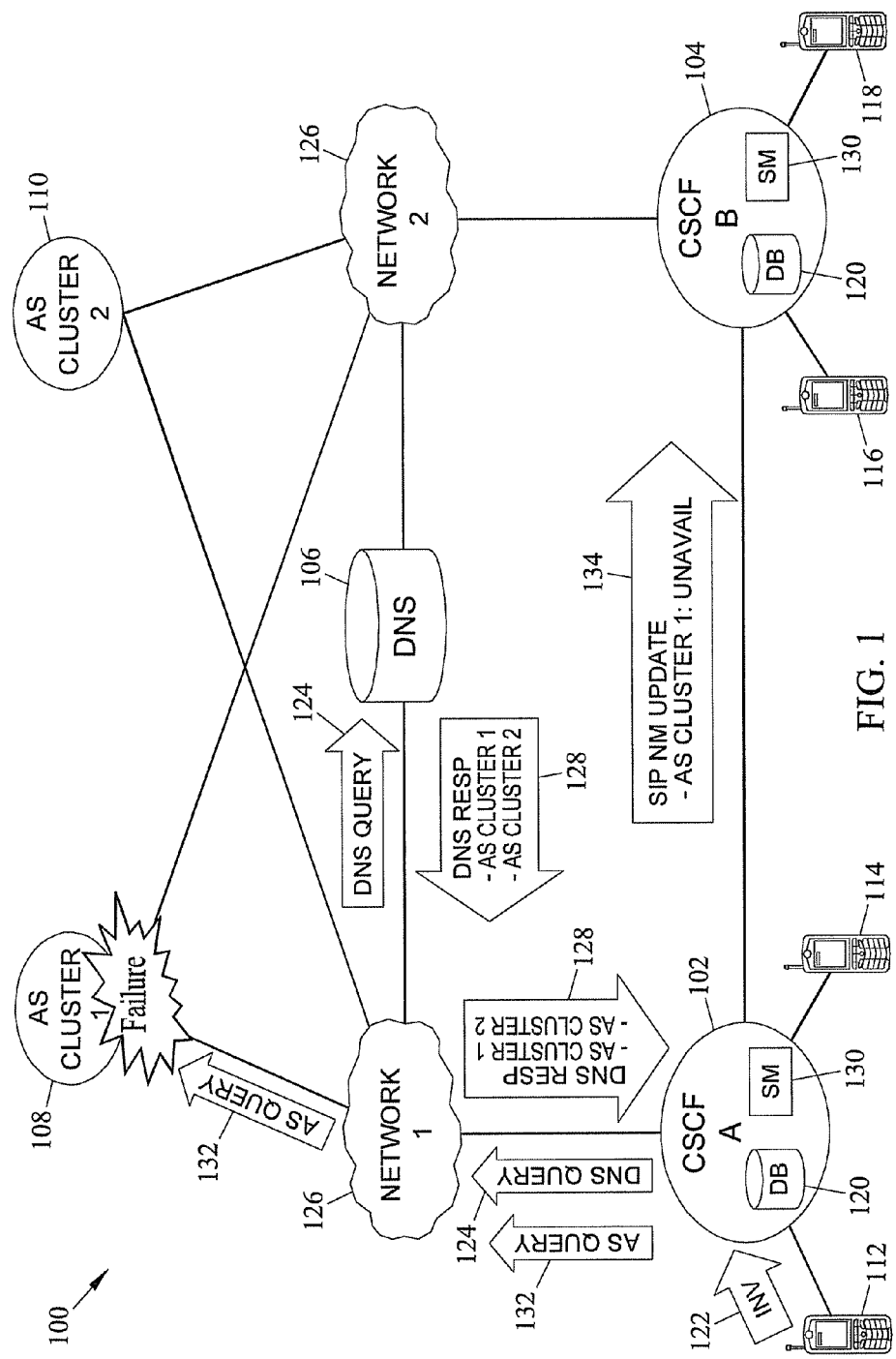
FIG. 1 is a block diagram of a SIP/IMS network in which embodiments of the subject matter described herein may be implemented.

The subject matter described herein provides methods, systems, and computer readable media for distributing application or higher layer communications network signaling entity operational status information among SIP nodes according to an embodiment of the subject matter described herein. FIG. 1 illustrates a SIP/IMS network 100 in which embodiments of the subject matter described herein may be implemented. In FIG. 1, network 100 is an IMS network that includes IMS nodes that use SIP for call setup. However, the subject matter described herein is not limited to distributing application or higher layer communications network signaling entity operational status information among IMS nodes. For example, the subject matter described herein may be used to distribute application or higher layer communications network signaling entity operational status information among any entities that use the SIP protocol. Exemplary network entities that utilize the SIP protocol include next generation network (NGN) nodes, softswitches, media gateway controllers, SIP proxy servers, and SIP redirect servers.

Referring to FIG. 1, SIP/IMS network 100 includes a plurality of SIP/IMS call control elements, including CSCF nodes 102 and 104, a domain name system (DNS) server 106, and SIP application server clusters 108 and 110. Further, SIP/IMS network 100 includes IP networks 112 and 114, connected to elements 102, 104, 106, 108, and 110 and including suitable network devices for communicating messages between elements 102, 104, 106, 108, and 110. CSCF nodes 102 and 104 may provide control interface and message transfer operations for a plurality of SIP devices 112, 114, 116, and 118. SIP devices 112, 114, 116, and 118 may be any user equipment capable of establishing multimedia sessions using SIP, including mobile and fixed terminals. SIP application server clusters 108 and 110 may each include one or more SIP servers.

In order to establish a session, an originating SIP device 112 may send a SIP INVITE message to CSCF node 102. CSCF node 102 may query DNS server 106 to identify the IP address corresponding to an application server, which represents the point of contact into the destination subscriber's network. DNS server 106 may return the identifier or IP address associated with more than one application server cluster. CSCF node 102 may determine operational status information of the application servers. The operational status information may be determined based upon a response or lack of response by the application server(s) to a query message sent by CSCF node 102. If the application server(s) responds to the query message within a predetermined time period, CSCF node 102 may determine that the application server(s) is available. Otherwise, if there is no response to the query message within the predetermine time period, CSCF node 102 may determine that the application server(s) is unavailable. An exemplary protocol for determining application server or SIP server operational status is described in further detail in the above-referenced co-pending patent application.

Rather than requiring each network node to implement the query-response procedure each time a node desires to contact a SIP server or other application server, the subject matter described herein includes distributing SIP server operation status information among SIP entities. In the example illustrated in FIG. 1, CSCF node 102 maintains a database 120 including a list of peer network nodes associated with CSCF node 102. The operational status information of the SIP application server(s) may be communicated to the SIP entities in the list. For example, the list may identify CSCF node 104. The operational status information of the application server(s) may be communicated to CSCF node 104. As a result of providing operational status information to listed SIP entities, the listed SIP entities may take advantage of the operational status information maintained by CSCF node 104 and use the operational status information to avoid costly timeout latency and delays associated with individually determining the operational status information. The list of peer network nodes may be updated with application or higher layer communications network signaling entity operational status information as updated information is determined, and the updated information may be communicated to the peer network nodes.

Figure 2A:
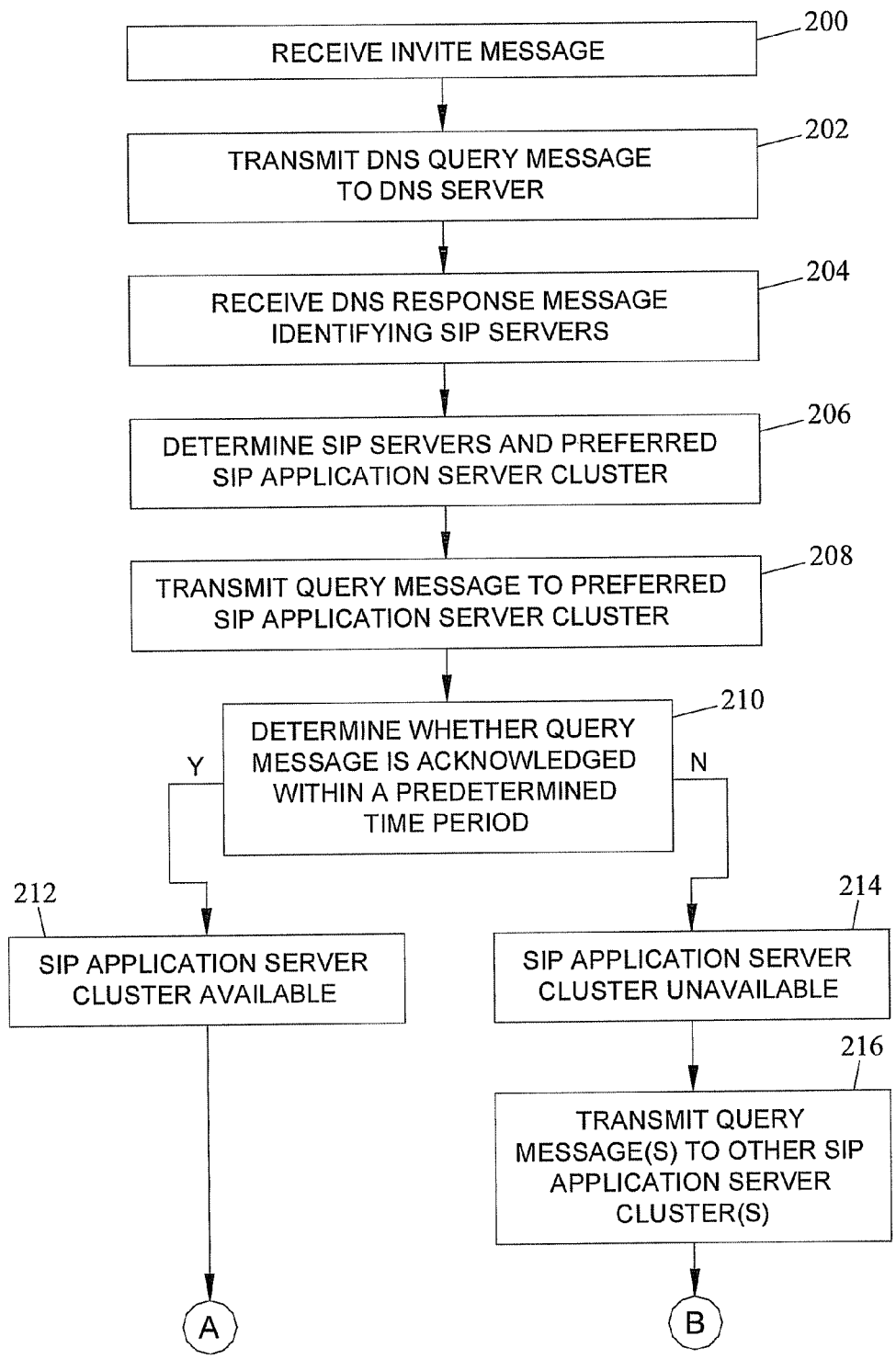
FIGS. 2A and 2B are a flow chart of an exemplary process for distributing application or higher layer communications network signaling entity operational status information among SIP entities according to an embodiment of the subject matter described herein.
Figure 2B:
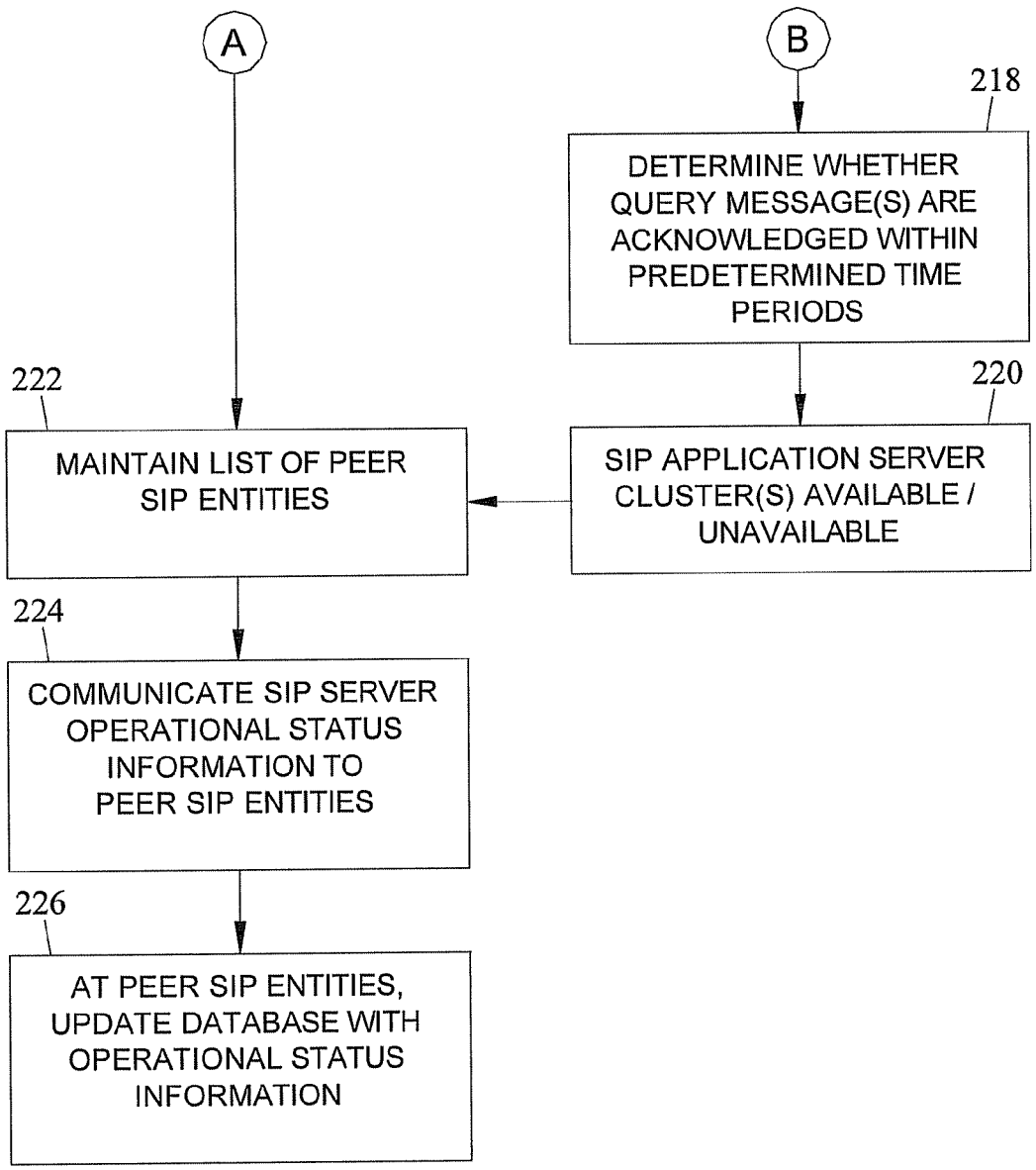

FIGS. 2A and 2B are a flow chart illustrating an exemplary process for obtaining, using, and distributing application or higher layer communications network signaling entity operational status information according to an embodiment of the subject matter described herein. Referring to FIGS. 1, 2A and 2B, CSCF node 102 may receive an INVITE message 122 from SIP device 112 to establish a session with another SIP device or a non-SIP device (block 200). In response to the INVITE, CSCF node 102 may generate a DNS query message 124 to determine an IP address of the called party and transmit message 124 to DNS server 106 via communications network 126 (block 202).

In response to receiving DNS query message 124, DNS server 106 may generate a DNS response message 128 identifying the IP addresses of SIP application server clusters 108 and 110, which represent points of contact into the destination subscriber's network. DNS response message 128 may identify a preferred application server cluster for the requested URI/service. In this example, DNS response message 128 indicates that application server cluster 108 is preferred over application server cluster 110. DNS server 106 may transmit DNS response message 128 to CSCF node 102 via network 126. At block 204, CSCF node 102 may receive DNS response message 128.

Upon receiving DNS response message 128, a application or higher layer communication network entity status management (SM) module 130 of CSCF node 102 may determine the IP addresses of SIP application server clusters 108 and 110 from the DNS response message and may determine that SIP application server cluster 108 is preferred over SIP application server cluster 110 (block 206). In response to determining that application server cluster 108 is preferred, SM module 130 may generate an application server operational status query message 132 for transmission to application server cluster 108 via network 126 (block 208).

SM module 130 may determine application or higher layer communications network signaling entity operational status information for the preferred SIP application server cluster 108 by determining whether message 132 is acknowledged within a predetermined time period (block 210). In particular, upon transmission of message 132, SM module 130 may initiate a timer for determining the expiration of a predetermined time period from transmission of the application server operational status query message. If a response is received within the predetermined time period, SM module 130 may determine that application server cluster 108 is available to CSCF node 102 (block 212). In this case, the availability status of application server cluster 108 is set to available in database 120. If it is determined that an acknowledgement of message 132 has not been received within the predetermined time period, SM module 130 may determine that application server cluster 108 is unavailable (block 212). In this case, the availability status of application server cluster 108 is set to unavailable in database 120 (block 214).

If it is determined that the preferred application server cluster 108 is unavailable, one or more query messages may be generated and transmitted to network 126 for communication to each of the other application server clusters identified in message 128 (block 216). For example, a query message may be generated and transmitted to network 126 for communication to application server cluster 110. There may be one or more other SIP application server clusters identified in the DNS response message. Referring to FIG. 2B, in block 218, a query message may be sent to each SIP application server cluster and a timer set for each message for determining whether respective acknowledgement messages are received within respective predetermined time periods.

In block 220, the status(es) of the other SIP application server cluster(s) is set as available or unavailable based on whether receipt of acknowledgement message occurs within the predetermined time period. For example, for application server cluster 110, it is determined whether the acknowledgement message destined for application server cluster 110 is acknowledged within the predetermined time period. If an acknowledgement message is received within the predetermined time period, SM module 130 may determine that application server cluster 110 is available to CSCF node 102. In this case, the operational status of application server cluster 110 is set to available in database 120. If it is determined that the acknowledgement message is not received within the predetermined time period, SM module 130 may determine that application server cluster 110 is unavailable. In this case, the operational status of application server cluster 110 is set to unavailable in database 120.

Referring to FIG. 2B, in block 222, SM module 130 may maintain a list of peer SIP entities. The list may be stored in database 120 and identify one or more network nodes to receive operation status information for one or more application server clusters. For example, the list may identify CSCF node 104 as a node 104 to receive status information for application server clusters 108 and/or 110. The identified peer SIP entities may have subscriptions for receiving operational status information of identified application server clusters. For example, CSCF node 104 may have a subscription for receiving operational status information updates with respect to application server clusters 108 and 110.

In block 224, SM module 130 may communicate application or higher layer communications network signaling entity operational status information to subscribed or identified peer SIP entities. For example, SM module 310 may generate a SIP network management update message 134 identifying application server cluster 108 as being unavailable. Message 134 may be generated when it is determined that application server cluster 108 is unavailable to CSCF node 102. SM module 310 may transmit message 134 to CSCF node 104 since node 104 is subscribed to operational status information for cluster 108. Operational status information for cluster 108 may also be communicated to other subscriber network nodes that have subscriptions.

In block 226, CSCF node 104 may receive message 134 and may update database 120 with operational status information contained in message 134. Similarly, other nodes receiving an update message may update their databases with operational status information. As a result of the operational status information update, peer SIP entities receiving the update may take advantage of the work performed by CSCF node 102 of in determining the operational status information. For example, prior to communicating a message to a SIP server or other application or higher layer communications network signaling entity, CSCF node 104 may check the application or higher layer communications network signaling entity operational status information with respect to the SIP server. If the SIP server is unavailable, costly timeout latency and delays may be avoided by communicating the message to a suitable alternative SIP server.

Upon receipt of a SIP network management update message 134 indicating the availability of a SIP server, a peer SIP entity may communicate a test message to the SIP server for determining the availability of the SIP server from its perspective. For example, the SIP server may be unavailable to one peer SIP entity but not another SIP entity. Therefore, the SIP entity receiving the application or higher layer communications network signaling entity operational status information may transmit a test message to the SIP server for confirming the application or higher layer communications network signaling entity operational status information indicated by the update message. After testing the SIP server, the SIP entity may update a list maintained at the SIP entity with results of the test with regard to the operational status information of the SIP server.

Figure 3:
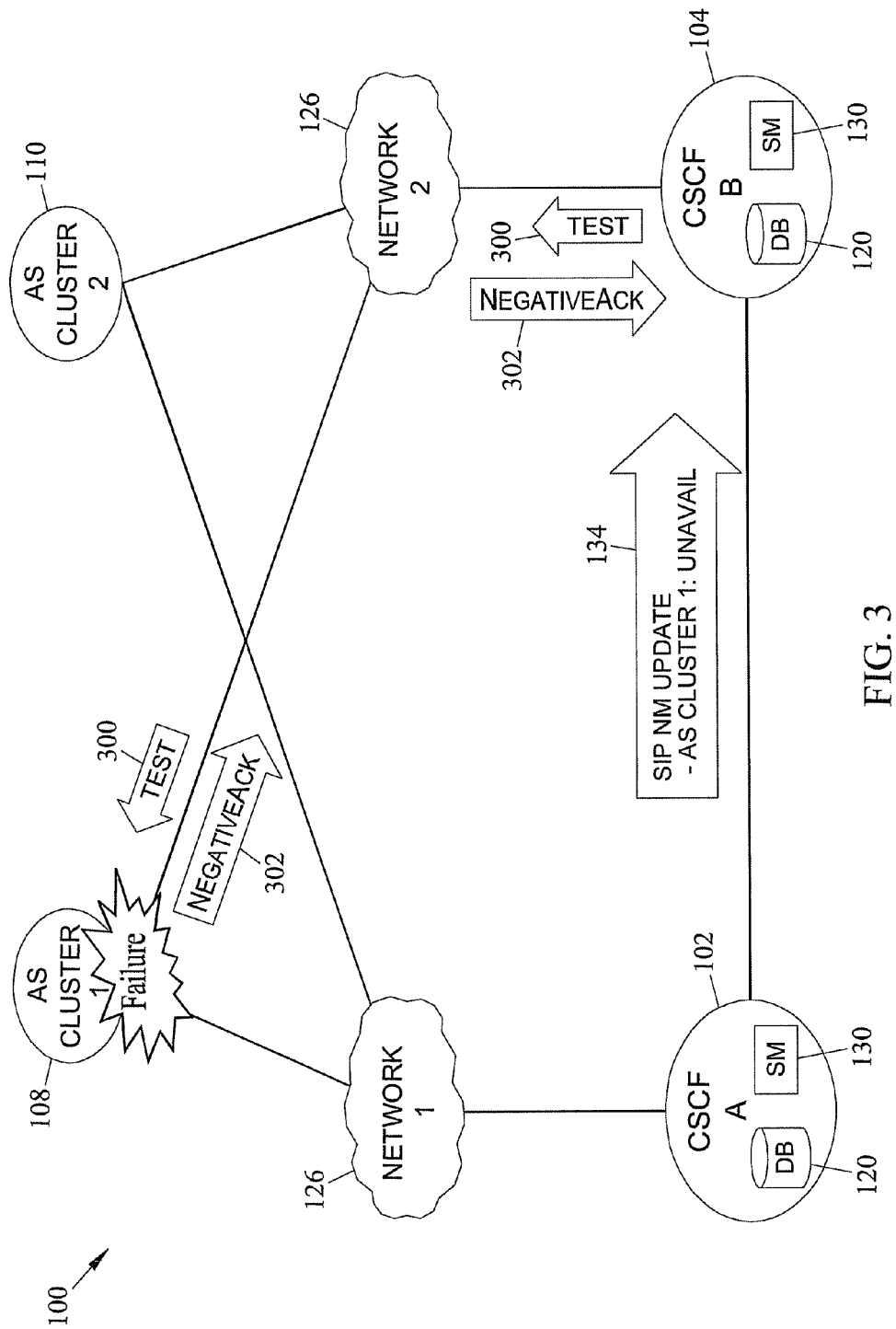
FIG. 3 is a block diagram of a network including exemplary messages for confirming the application or higher layer communications network signaling entity operational status information indicated by an update message in accordance with an embodiment of the subject matter described herein.

FIG. 3 is network 100 including exemplary messages for confirming the application or higher layer communications network signaling entity operational status information indicated by an update message in accordance with an embodiment of the subject matter described herein. In this example, SIP application server cluster 108 is unavailable to both CSCF nodes 102 and 104. Referring to FIG. 3, CSCF node 102 has determined that SIP application server cluster 108 is unavailable. In response to determining the unavailability of server cluster 108, CSCF node 102 generates update message 134 identifying the availability of server cluster 108 to peer SIP entities identified in the list maintained by database 120 and that are associated with server cluster 108. Update message 134 is transmitted to CSCF node 104.

In response to receiving update message 134, CSCF node 104 initiates a test of its connection to server cluster 108. In particular, CSCF node 104 generates a test message 300 destined to server cluster 108 for determining the availability of server cluster 108 with respect to CSCF node 104. CSCF node 104 may transmit test message 300 to network 126 for communication to server cluster 108. Additionally, CSCF node 104 may initiate a timer for determining whether an acknowledgement message or negative acknowledgement message has been received within a predetermined time period. In this example, in response to test message 300, a negative acknowledgement message 302 is generated by server cluster 302 and transmitted to network 126 for communication to CSCF node 104. Message 302 indicates the unavailability of server cluster 108. In response to receiving message 302, SM module 130 of CSCF node 130 may update database 120 to indicate the unavailability of server cluster 108. Further, if a message is not received in response to message 300 within the predetermined time period, SM module 130 may update database 120 to indicate the unavailability of server cluster 108.

Figure 4:
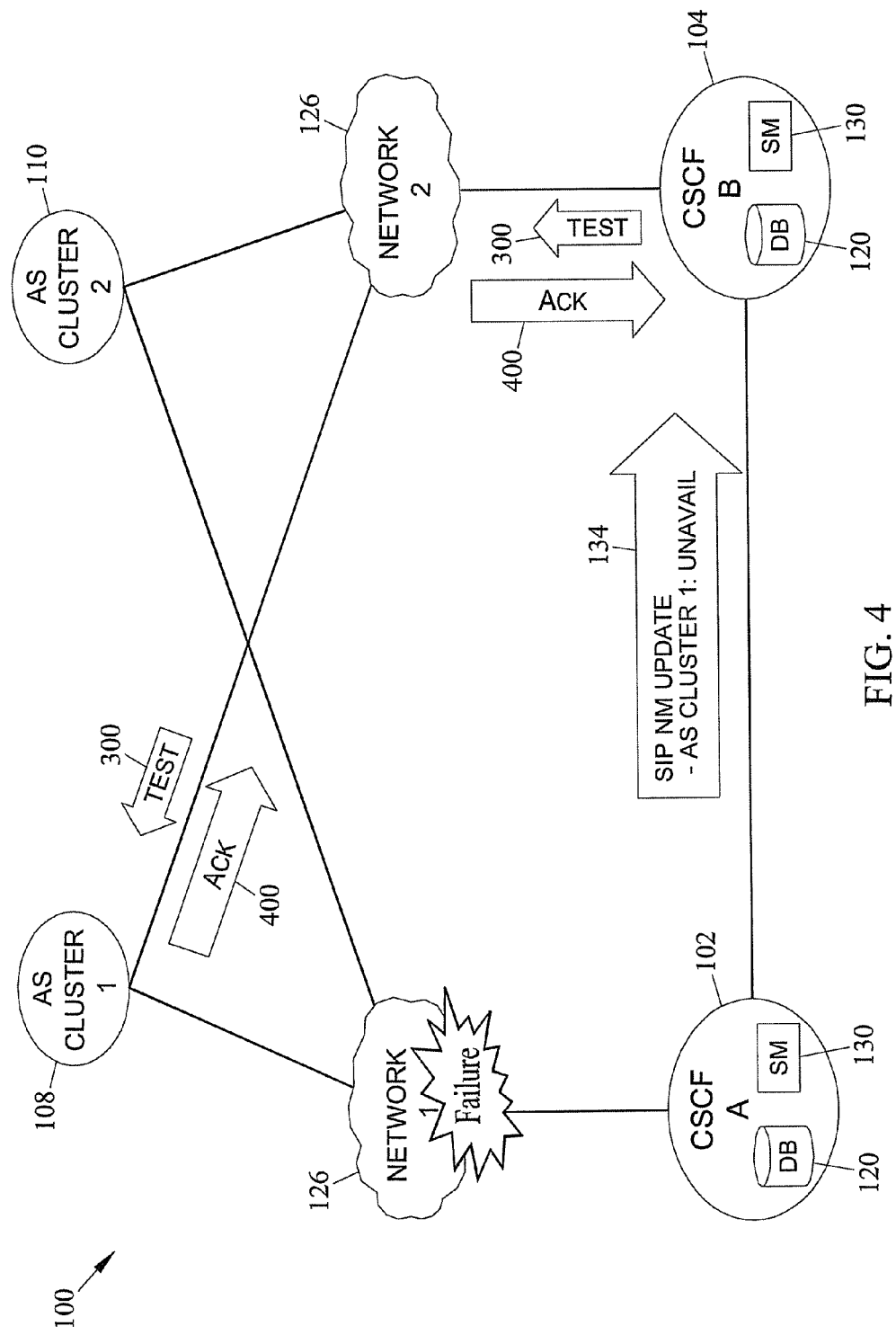
FIG. 4 is a block diagram of a network in which a server cluster is unavailable to CSCF node in accordance with an embodiment of the subject matter described herein.

FIG. 4 illustrates an example in which server cluster 108 is unavailable to CSCF node 102 and available to CSCF node 104. In particular, network 1 126 is unable to deliver messages from CSCF node 102 to server cluster 108. As such, server cluster 108 is unavailable to CSCF node 102. Server cluster 108 is available to CSCF node 104 through network 2 126. Referring to FIG. 4, CSCF node 102 has determined that application server cluster 108 is unavailable. In response to determining the unavailability of server cluster 108, CSCF node 102 generates update message 134 identifying server cluster 108 as being unavailable. Update message 134 is transmitted to CSCF node 104.

In response to receiving update message 134, CSCF node 104 may initiate a test of its connection to server cluster 108. In particular, CSCF node 104 may generate a test message 300 destined to server cluster 108 for determining the availability of server cluster 108 with respect to CSCF node 104. CSCF node 104 may transmit test message 300 to network 126 for communication to server cluster 108. Additionally, CSCF node 104 may initiate a timer for determining whether an acknowledgement message or negative acknowledgement message has been received within a predetermined time period. In this example, in response to test message 300, an acknowledgement message 400 is generated by server cluster 108 and transmitted to network 126 for communication to CSCF node 104. Message 400 indicates the availability of server cluster 108 to CSCF node 104. In response to receiving message 400, SM module 130 of CSCF node 130 may update database 120 to indicate the availability of server cluster 108.

In another example of CSCF node 104 testing the availability of a SIP server, server cluster 108 may be available to CSCF node 102. In this example, CSCF node 102 may determine that server cluster 108 is available. As a result, CSCF node 102 may transmit an update message indicating the availability of server cluster 108. In response to receiving the update message, CSCF node 104 may transmit a test message destined to server cluster 108 for determining the availability of server cluster 108 with respect to CSCF node 104. Additionally, CSCF node 104 may initiate a timer for determining whether an acknowledgement message or negative acknowledgement message has been received within a predetermined time period. If an acknowledgement message is received within the predetermined time period, SM 130 of CSCF node 130 may update database 120 to indicate the availability of server cluster 108. Otherwise, if a negative acknowledgement message is received within the predetermined time period or the predetermined time period expires prior to receiving a response message, SM 130 of CSCF node 130 may update database 120 to indicate the unavailability of server cluster 108.

In another embodiment of the subject matter disclosed herein, a network management proxy can maintain a database including peer SIP entity subscription information for communicating operational status information of SIP servers to peer SIP entities who are subscribed to receive such information. SIP entities may communicate subscription requests to a network management proxy for operational status information of one or more SIP servers. The proxy may communicate test messages to SIP servers for determining whether the status of the SIP servers. Operational status information may be communicated to the subscribed SIP entities.

Figure 5:
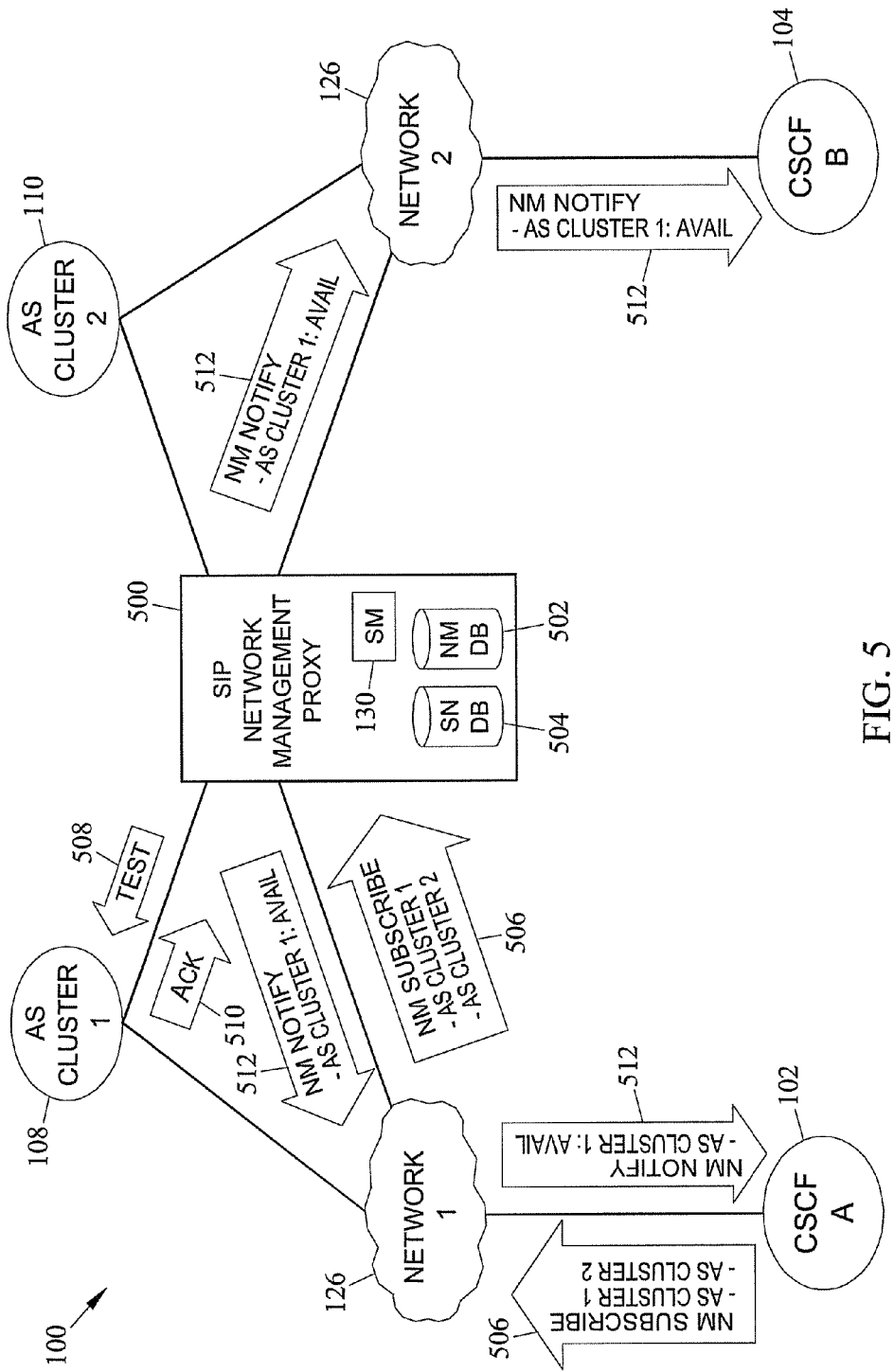
FIG. 5 is a block diagram of a SIP/IMS network including a SIP network management proxy according to an embodiment of the subject matter disclosed herein.

FIG. 5 is a SIP/IMS network 100 including a SIP network management proxy according to an embodiment of the subject matter disclosed herein. Referring to FIG. 5, a SIP network management proxy 500 may include a network management database 502 and a subscription/notification database 504. Network management database 502 may store application or higher layer communications network signaling entity operational status information associated with SIP servers or other application or higher layer communications network signaling entities. Subscription/notification database 504 may store information identifying subscribed SIP entities and information identifying SIP servers or other application or higher layer communications network signaling entities to which each SIP entity is subscribed to receive operational status information.

Figure 6:
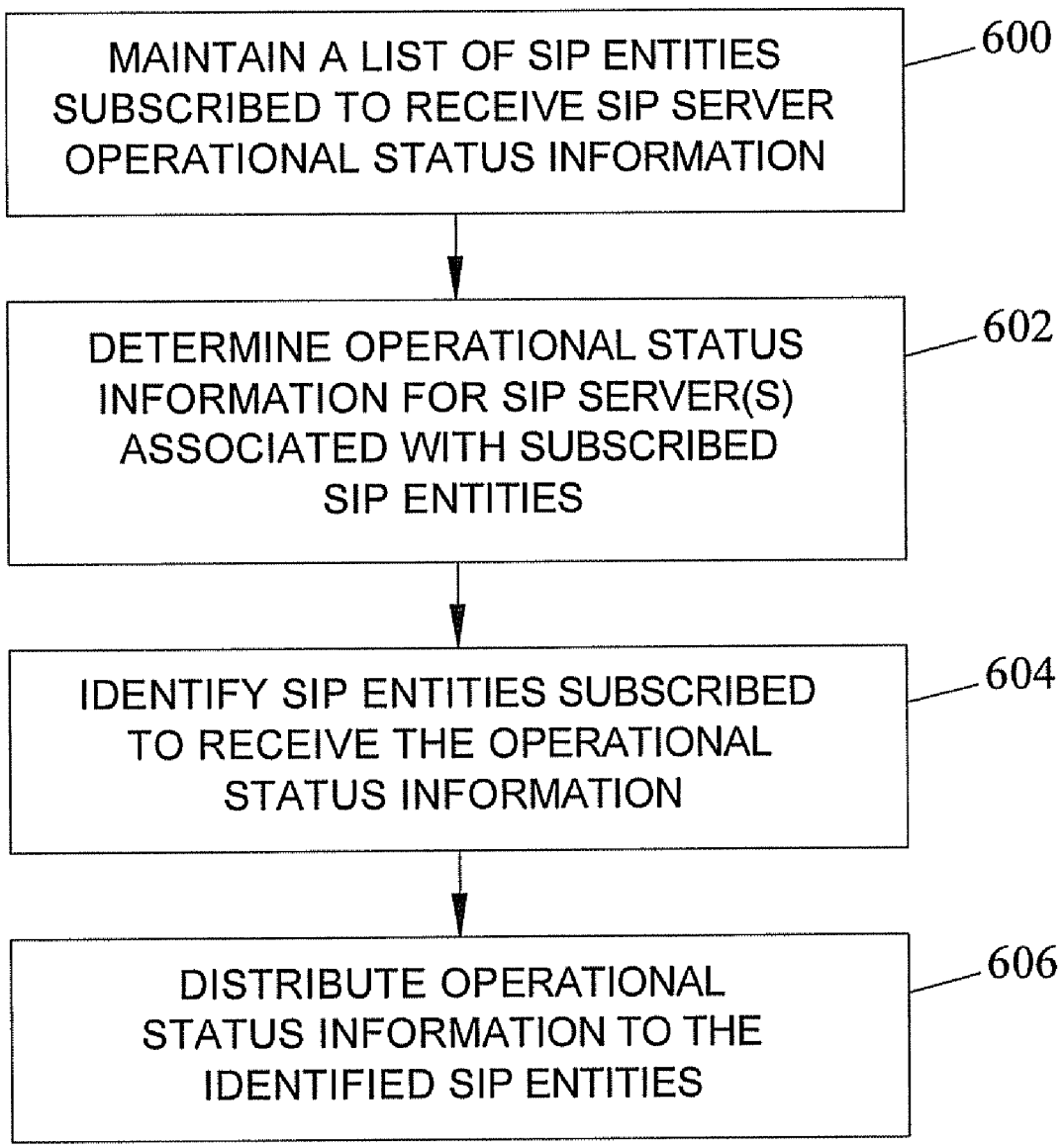
FIG. 6 is a flow chart of an exemplary process for distributing application or higher layer communications network signaling entity operational status information among SIP nodes according to an embodiment of the subject matter described herein.

FIG. 6 is a flow chart illustrating an exemplary process for distributing application or higher layer communications network signaling entity operational status information to SIP entities according to an embodiment of the subject matter described herein. Referring to FIGS. 5 and 6, SIP network management proxy 500 maintains a list of SIP entities subscribed to receive application or higher layer communications network signaling entity operational status information (block 600). For example, database 504 may include the list of subscribed SIP entities.

A SIP entity may become a subscriber to application or higher layer communications network signaling entity operational status information by communicating a request to proxy 500. In one example, CSCF node 102 may send a request for a subscription to operational status information of a SIP server to SIP network management proxy 500. CSCF node 102 may generate a network management subscribe message 506 and may communicate message 506 to proxy 500 for subscribing to operational status information associated with server clusters 108 and 110. On receipt of message 506, an identifier for CSCF node 102 may be added to the subscriber list maintained by database 504 for identifying CSCF node 102 as a subscribing to for server clusters 108 and 110. Further, CSCF node 102 may unsubscribe to operational status information by communicating a network management unsubscribe message to proxy 500 for unsubscribing to one or more identified clusters.

In block 602, SM module 130 determines application or higher layer communications network signaling entity operational status information for SIP servers to which SIP entities are subscribed to receive the operational status information. For example, SM module 130 may generate a test message 508 and may communicate test message 508 to server cluster 108 for testing the operational status of server cluster 108. On receipt of an acknowledgement message 510 from server cluster 108, SM module 130 may determine that server cluster 108 is available. Otherwise, if an acknowledgement message or other message indicating the availability of server cluster 108 is not received within a predetermined time period, SM module 130 may determine that server cluster 108 is unavailable. Further, SM module 130 may determine that server cluster 108 is unavailable on receipt of a negative acknowledgement message in response to the test message. After testing the SIP server, SM module 130 may update the list maintained by database 502 with results of the test. As a result, database 502 maintains updated information regarding the operational status of SIP servers within server cluster 108. Periodically, SM module 130 may perform confirmation testing of SIP servers for updating operational status information in database 502.

In block 604, SM module 130 identifies network nodes to receive application or higher layer communications network signaling entity operational status information. For example, SM module 130 may examine the subscription list maintained in database 504 to determine that CSCF node 102 is subscribed to operational status information for server cluster 108. On an update of the operational status information for server cluster 108, SM module 130 may perform a search of database 504 for identifying SIP entities subscribed to receive operational status information for server cluster 108.

In block 606, SM module 130 distributes the application or higher layer communications network signaling entity operational status information to the identified SIP entities. For example, SM module 130 may generate network management notify messages 512 identifying the status of server cluster 108 and may send the messages to SIP entities that subscribe to the operational status information for server cluster 108. In this particular example, since the status of server cluster 108 is available, messages 512 identify server cluster 108 as being available. One of notify messages 512 may be sent to CSCF node 102. CSCF node 104 may also be subscribed to operational status information for server cluster 108, and therefore be sent notify message 512. As a result of receiving the operational status information contained in the message, CSCF nodes 102 and 104 may determine the availability or unavailability of server cluster 108 and may use the information for planning communication with SIP servers that are operational (e.g., available SIP servers).

Figure 7:
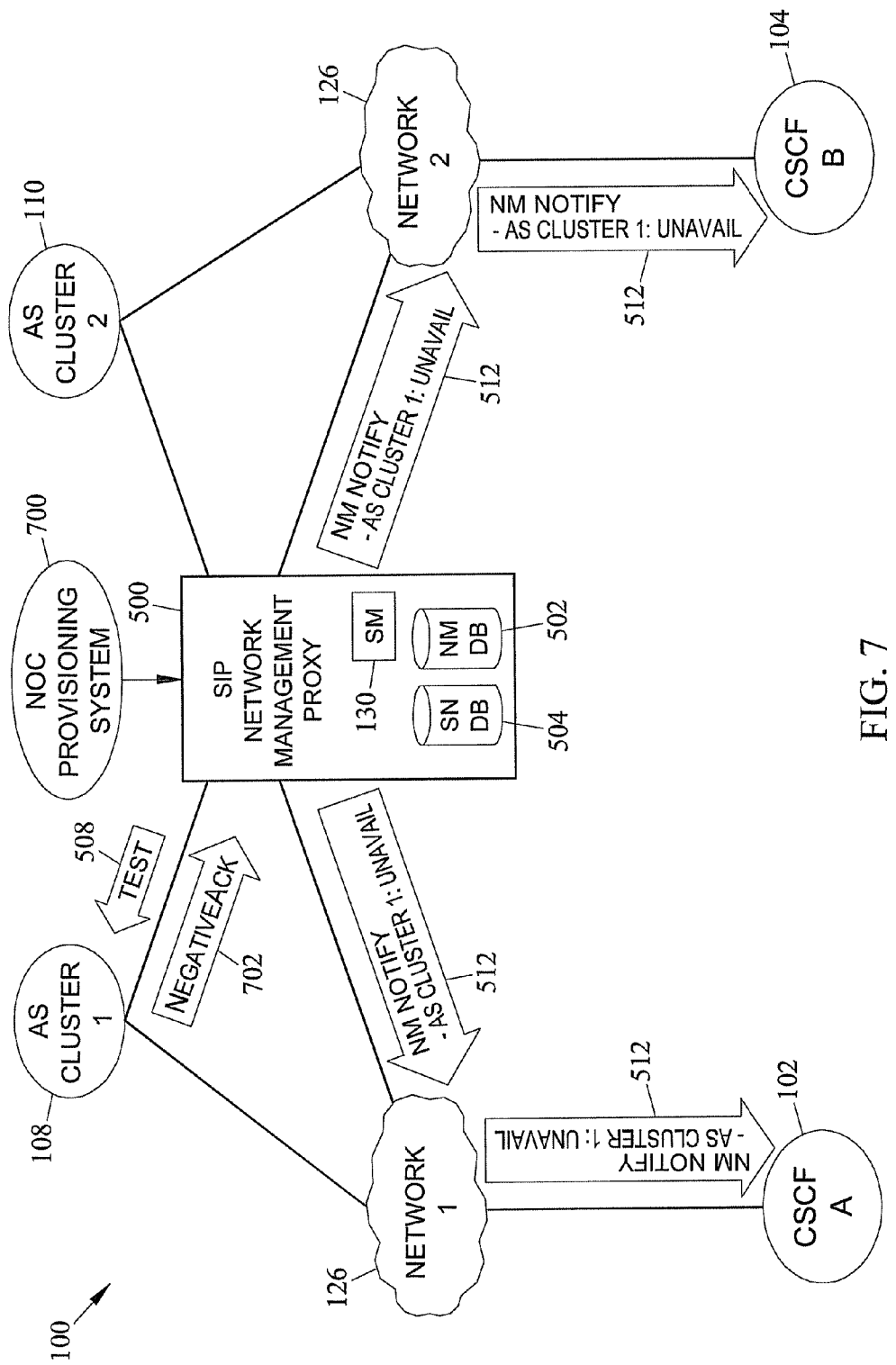
FIG. 7 is a block diagram of a SIP/IMS network including an external provisioning system operable to communicate subscription request message to a SIP network management proxy according to an embodiment of the subject matter disclosed herein.

As an alternative to network nodes requesting subscriptions to application or higher layer communications network signaling entity operational status information, an external provisioning system may communicate subscription request messages to a SIP network management proxy. For example, FIG. 7 illustrates network 100 including an external provisioning system 700 operable to communicate subscription request message to proxy 500 according to an embodiment of the subject matter disclosed herein. Referring to FIG. 7, system 700 may communicate a subscription request message that requests subscriptions to operational status information to application cluster 108 for CSCF nodes 102 and 104. In response to receiving the subscription request, an identifier for CSCF nodes 102 and 104 may be added to the subscription list maintained by database 504 for identifying CSCF nodes 102 and 104 as subscribers for server cluster 108.

SM module 130 may generate a test message 508 and may communicate test message 508 to server cluster 108 for testing the operational status of server cluster 108. On receipt of a negative acknowledgement message 702 from server cluster 108, SM module 130 may determine that server cluster 108 is unavailable. After testing the SIP server, SM module 130 may update the list maintained by database 502 with results of the test. SM module 130 may identify CSCF nodes 102 and 104 as being subscribed to operational status information for server cluster 108. Further, SM module 130 may generate network management notify messages 512 identifying the status of server cluster 108 and may send the messages to nodes 102 and 104.

Table 1 below shows exemplary SIP server event subscription data maintained by proxy 500.

TABLE 1

Exemplary SIP Server Event Subscription Data

| Subscribing SIP Entity | Subscribed to SIP Server | Network Management Event Type |
| --- | --- | --- |
| CSCF A | AS Cluster 1 | Congestion |
| CSCF A | AS Cluster 1 | Failure |
| CSCF B | AS Cluster 1 | Failure |

In Table 1, subscribing SIP entities in the list maintained by proxy 500 includes "CSCF A" and "CSCF B". Each of the subscriber network nodes is subscribed to events for SIP server "AS Cluster 1". Particularly, the CSCF A node is subscribed to congestion and failure events for AS Cluster 1, and the CSCF B node is subscribed to congestion events for AS Cluster 1. Accordingly, the CSCF A and CSCF B nodes will be notified by proxy 500 on the occurrence of these events.

Figure 8:
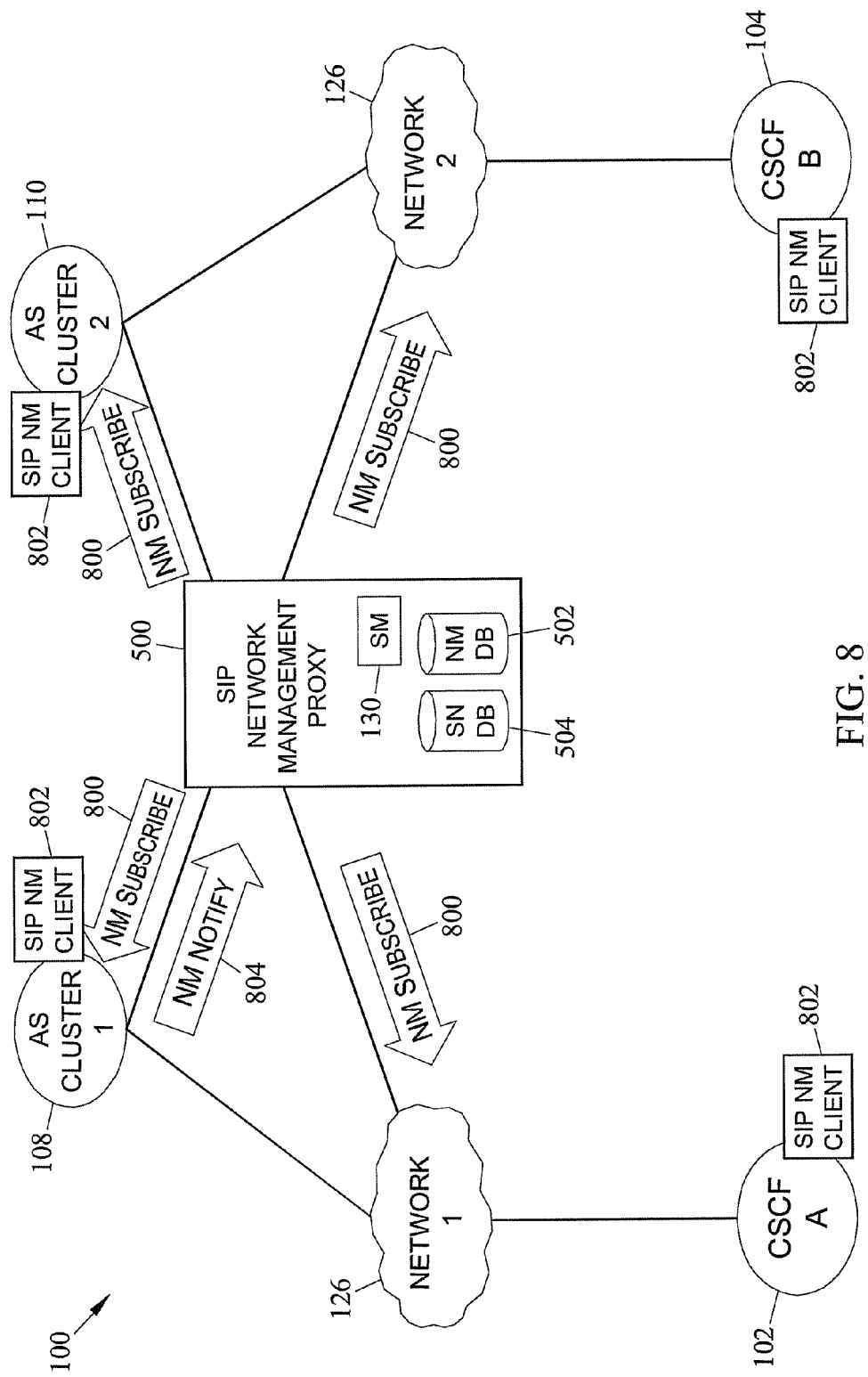
FIG. 8 is a block diagram of a SIP/IMS network including a SIP network management proxy operable to subscribe to network nodes that have access to event information associated with application or higher layer communications network signaling entity operational status according to an embodiment of the subject matter disclosed herein.

According to another embodiment of the subject matter disclosed herein, a SIP network management proxy functions as a host for application or higher layer communications network signaling entity operational status information by subscribing to network nodes that have access to event information associated with application or higher layer communications network signaling entity operational status. The proxy may distribute received application or higher layer communications network signaling entity operational status information to subscribing SIP entities. FIG. 8 illustrates network 100 including SIP network management proxy 500 operable to subscribe to network nodes that have access to event information associated with application or higher layer communications network signaling entity operational status. Referring to FIG. 8, SM module 130 of proxy 500 is operable to generate network management subscription messages 700 and operable to communicate messages 800 to network nodes having SIP network management clients 802. For example, application clusters 108 and 110 and CSCF nodes 102 and 104 may includes SIP network management clients 702. Proxy 500 may communicate messages 800 to network nodes 102, 104, 108, and 110 for subscribing to application or higher layer communications network signaling entity operational status information maintained at the respective network node. Clients 802 may register the subscription request in a local database.

Clients 802 may maintain information associated with the operational status of one or more SIP servers. The operational status information may include network management event information related to the operational status of a SIP server. For example, network management event information may include SIP server application failure and congestion event information, such as congestion or failure of a layer 5 application. Proxy 500 may request a subscription to a specific type of event, such as a failure event or a congestion event. Table 2 below shows exemplary SIP server event subscription data maintained by a SIP network management client.

TABLE 2

Exemplary SIP Server Event Subscription Data

| Event | Notify |
| --- | --- |
| Application X Failure | SIP_NMP@Tekelec.com |
| Application X Congestion | SIP_NMP@Tekelec.com |

In Table 2, events "Application X Failure" and "Application X Congestion" correspond to a SIP application failure and congestion, respectively, of a SIP application X. The network node identified by "SIP_NMP@Tekelec.com" is notified on the triggering of one of the events by the communication of a network management notify message identifying the event.

Once proxy 500 has subscribed to application or higher layer communications network signaling entity operational status information maintained at a network node, the network node may generate and communicate a network management notify message 804 to proxy 500 in response to the occurrence of an event to which the SIP network management proxy has a subscription. Notify message 804 may include network management information associated with the triggering network management event. In this manner, proxy 500 may efficiently collect and maintain application or higher layer communications network signaling entity operational status information for other network nodes in network 100. This application or higher layer communications network signaling entity operational status information may be distributed to other network nodes in accordance with the distribution techniques described herein.

Table 3 below shows exemplary application or higher layer communications network signaling entity operational status information maintained by proxy 500.

TABLE 3

Exemplary Application or Higher Layer Communications Network Signaling Entity Operational Status Information

| Network Node | Network Management Event |
| --- | --- |
| AS Cluster 1 | Application X Failure |
| AS Cluster 2 | Application X Congestion |
| CSCF B | Application Z Failure |

In Table 3, network nodes "AS Cluster 1," "AS Cluster 2," and "CSCF B" correspond to network management events "Application X Failure," "Application X Congestion," and "Application Z Failure". Thus, in this example, each of the network nodes listed in the database are unavailable due to SIP application congestion or failure.

Figure 9:
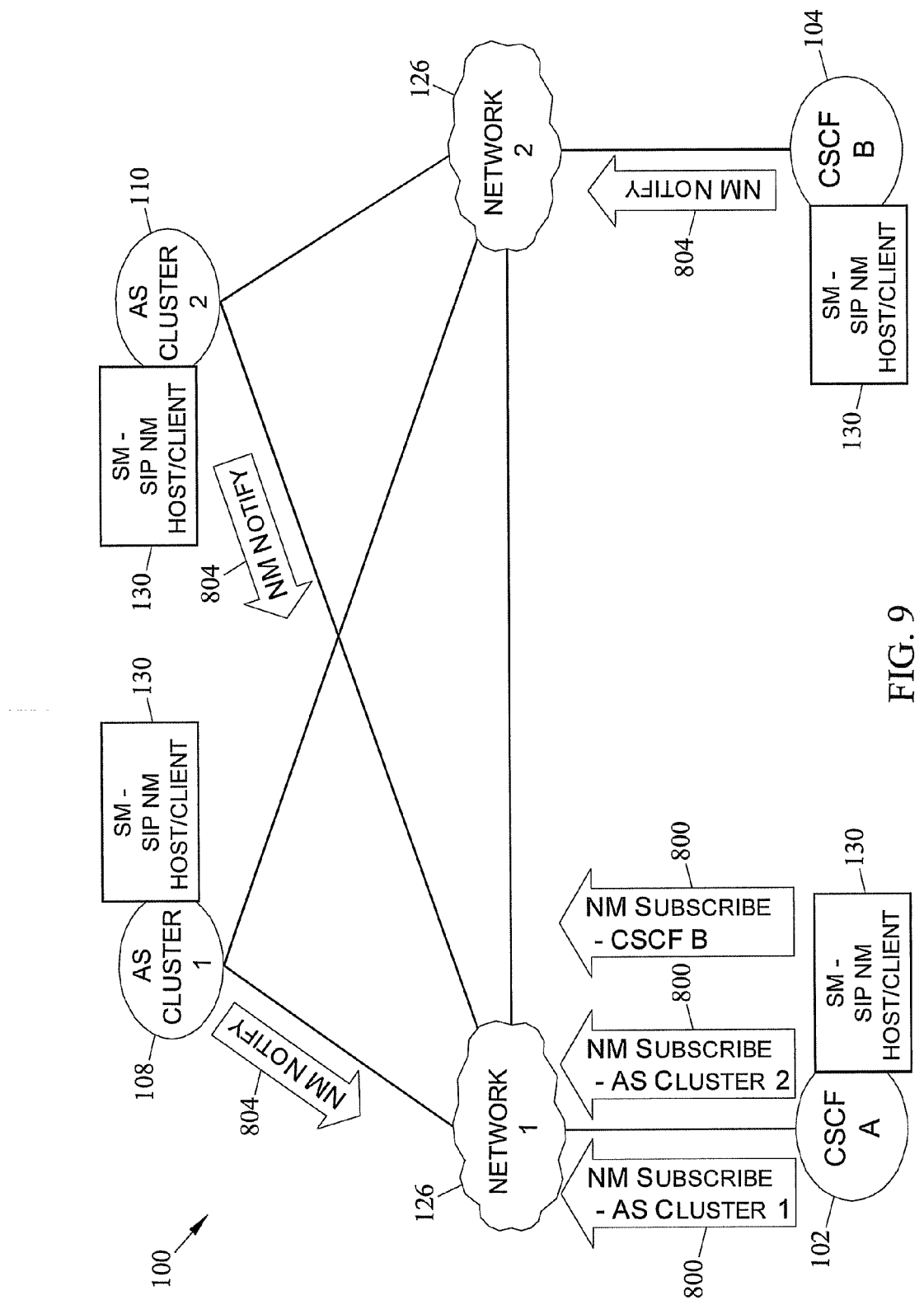
FIG. 9 is a block diagram of a SIP/IMS network including a plurality of SIP entities operable to distribute application or higher communications network signaling entity operational status information among one another according to an embodiment of the subject matter disclosed herein.

According to yet another embodiment of the subject matter disclosed herein, SIP entities maintain operational status information subscriptions with one another for distributing the operational status information among one another. The SIP entities may each maintain a list of other SIP entities subscribed to receive operational status information and may each distribute the operational status information to the other SIP entities using respective lists. FIG. 9 illustrates network 100 including a plurality of SIP servers 102, 104, 108, and 110 operable to distribute application or higher layer communications network signaling entity operational status information among one another. Referring to FIG. 9, each SIP server 102, 104, 108, and 110 may include SM module 130 having SIP network management host/client functionality for maintaining a list of other SIP servers and application or higher layer communications network signaling entity operational status information for which the other SIP servers have a subscription. SM module 130 is operable to generate and communicate network notify messages to one or more subscribing SIP entities for distributing its respective application or higher layer communications network signaling entity operational status information.

Figure 10:
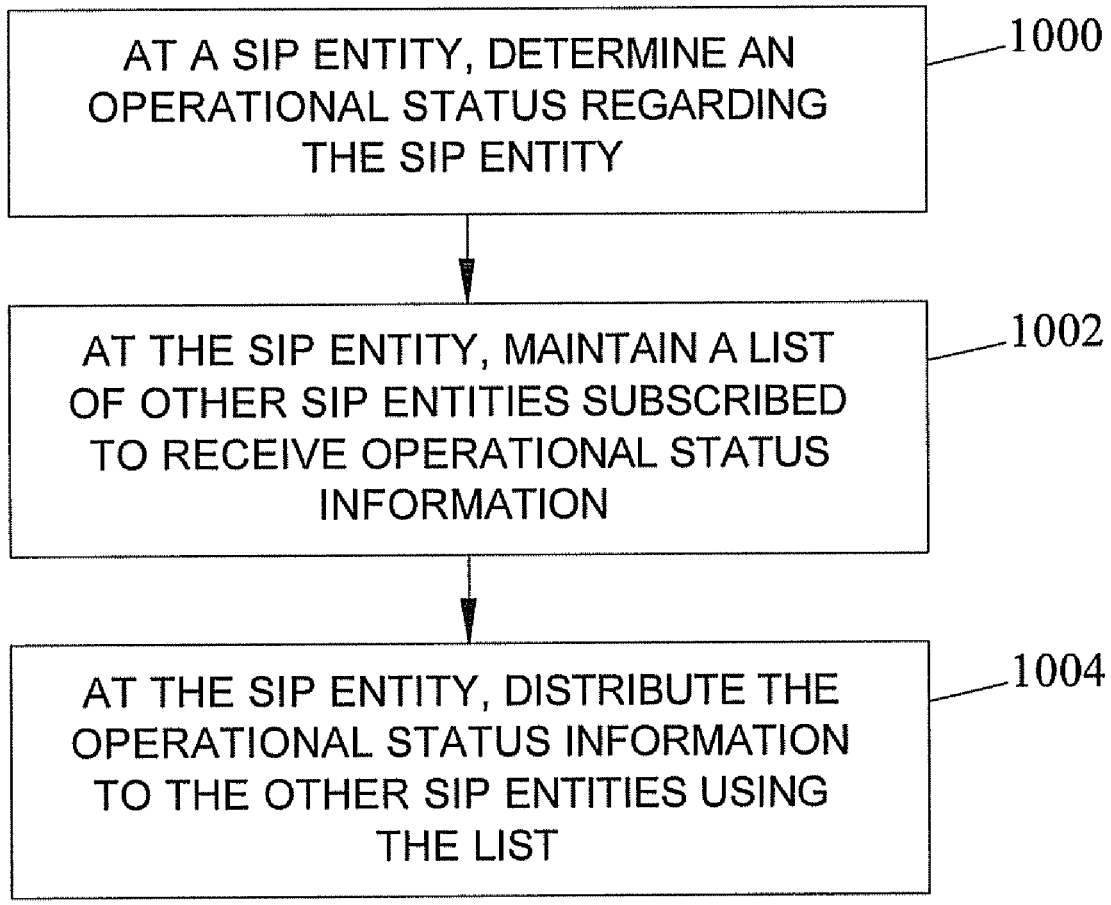
FIG. 10 is a flow chart of an exemplary process for distributing application or higher layer communications network signaling entity operational status information within the network shown in FIG. 9 according to an embodiment of the subject matter described herein.

FIG. 10 is a flow chart illustrating an exemplary process for distributing application or higher layer communications network signaling entity operational status information within network 100 shown in FIG. 9 according to an embodiment of the subject matter described herein. Referring to FIGS. 8 and 10, each of SIP servers 104, 108, and 110 includes SM module 130 determine the operational status of its associated SIP server and that maintains a list of other SIP servers subscribed to receive application or higher layer communications network signaling entity operational status information (blocks 1000 and 1002). For example, CSCF node 102 may be a subscriber to SIP operational status information determined by each of SIP servers 104, 106, and 110 regarding their respective operational status and maintained at each of SIP servers 104, 108, and 110. In one example, the operational status information may include high layer event information occurring at a respective SIP server, such as whether the SIP server is available or congested at the application layer. CSCF node 102 may subscribe by communicating subscribe messages 800 to each of SIP servers 104, 108, and 110. Upon receipt of messages 800, the SIP servers may add CSCF node 108 to respective subscriber lists.

In block 1004, SIP servers 104, 108, and 110 distribute operational status information to other SIP servers using the list. For example, each of SIP servers 104, 108, and 110 may communicate notify message 800 to CSCF node 102 indicating operational status information. As a result, operational status information may be distributed among subscriber SIP nodes.

As a result of distributing application or higher layer communications network signaling entity operational status information among SIP entities in accordance with the subject matter disclosed herein, inefficiencies in communicating with network signaling applications may be avoided. For example, SIP entities may be provided with up-to-date operation status information of SIP servers or other application or higher layer network signaling entities such that repeated attempts to contact a failed SIP server or other application or higher layer network signaling entity and associated time out periods are avoided. Such contact attempts and the associated time out periods result in a waste of resources of SIP servers and delay call establishment.

Although the examples described above relate primarily to obtaining and distributing application or higher layer operational status information regarding SIP servers and IMS nodes, the subject matter described herein is not limited to collecting and distributing operational status information for these types of nodes. The subject matter described herein may be used to collect and distribute operational status information regarding any type of application or higher layer communications network signaling entity, including an Internet protocol (IP) multimedia subsystem (IMS) entity, a next generation network (NGN) entity, a softswitch, a media gateway controller, a presence server, and an ENUM server. The methods and systems for obtaining operational status information for all of these various signaling entities are the same as those described above for SIP servers and IMS nodes. Hence, a description thereof will not be repeated herein.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for distributing application or higher layer communications network signaling entity operational status information among session initiation protocol (SIP) entities, the method comprising:
at a first SIP entity separate from an application or higher layer communications network signaling entity with which the first SIP entity communicates:
determining operational status information for the application or higher layer communications network signaling entity;
identifying at least one second SIP entity to receive the operational status information; and
distributing the operational status information to the at least one second SIP entity, wherein the first entity, the at least one second SIP entity, and the application or higher layer communications network signaling entity are associated with network nodes separate from subscriber communication terminals.

2. The method of claim 1 wherein the first SIP entity and the at least one second SIP entity each comprise one of an Internet protocol (IP) multimedia subsystem (IMS) entity, a next generation network (NGN) entity, a softswitch, a media gateway controller, a SIP proxy server, and a SIP redirect server.

3. The method of claim 1 wherein the first SIP entity comprises a SIP network management proxy.

4. The method of claim 1 wherein the application or higher layer communications network signaling entity comprises one of an Internet protocol (IP) multimedia subsystem (IMS) entity, a next generation network (NGN) entity, a softswitch, a media gateway controller, a presence server, and an ENUM server.

5. The method of claim 1 wherein determining operational status information regarding the application or higher layer communications network signaling entity includes determining one of availability and unavailability status information associated with the application or higher layer communications network signaling entity.

6. The method of claim 1 wherein determining operational status information regarding the application or higher layer communications network signaling entity includes determining congestion status information associated with the application or higher layer communications network signaling entity.

7. The method of claim 1 wherein determining operational status information for the application or higher layer communications network signaling entity includes determining whether a message communicated to the application or higher layer communications network signaling entity is acknowledged.

8. The method of claim 1 comprising maintaining a list of peer SIP entities of the first SIP entity, and wherein distributing the operational status information to the at least one second SIP entity includes distributing the operational status information to the peer SIP entities in the list.

9. The method of claim 1 wherein distributing the operational status information regarding the application or higher layer communications network signaling entity to the at least one second SIP entity includes communicating at least one SIP message including the operational status information regarding the application or higher layer communications network signaling entity to the at least one second SIP entity.

10. The method of claim 1 comprising, at the at least one second SIP entity, in response to receiving the operational status information regarding the application or higher layer communications network signaling entity, testing communication with the application or higher layer communications network signaling entity.

11. The method of claim 10 comprising, at the at least one second SIP entity, updating an operational status indicator for the application or higher layer communications network signaling entity maintained at the at least one second SIP entity with results of the test.

12. The method of claim 1 comprising maintaining a list of SIP entities subscribed to receive the operational status information regarding the application or higher layer communications network signaling entity and wherein identifying at least one second SIP entity to receive the operational status information for the application or higher layer communications network signaling entity includes identifying the at least one second SIP entity using the list.

13. The method of claim 12 wherein maintaining the list of SIP entities subscribed to receive the operational status information regarding the application or higher layer communications network signaling entity includes maintaining the list at a SIP network management proxy.

14. A method for distributing application or higher layer communications network signaling entity operational status information among SIP entities, the method comprising:
at a SIP entity:
determining operational status information regarding the SIP entity;
maintaining a list of other SIP entities subscribed to receive operational status information regarding the SIP entity; and
distributing the operational status information regarding the SIP entity to the other SIP entities using the list, wherein the SIP entities are associated with network nodes separate from subscriber communication terminals.

15. A system for distributing session initiation protocol application or higher layer operational status information among session initiation protocol (SIP) nodes, the system comprising:
an application or higher layer communications network signaling entity having an operational status;
a first SIP entity separate from the application or higher layer communications network signaling entity and configured to communicate with the application or higher layer communications network signaling entity, the first SIP entity determining the operational status of the application or higher layer communications network signaling entity, identifying at least one second SIP entity for receiving the operational status information and for distributing the operational status information to the at least one second SIP entity, wherein the first entity, the at least one second SIP entity, and the application or higher layer communications network signaling entity are associated with network nodes separate from subscriber communication terminals.

16. The system of claim 15 wherein the first SIP entity and the at least one second SIP entity each comprise one of an Internet protocol (IP) multimedia subsystem (IMS) entity, a next generation network (NGN) entity, a softswitch, a media gateway controller, a SIP proxy server, and a SIP redirect server.

17. The system of claim 15 wherein the first SIP entity comprises a SIP network management proxy.

18. The system of claim 15 wherein the application or higher layer communications network signaling entity comprises one of an Internet protocol (IP) multimedia subsystem (IMS) entity, a next generation network (NGN) entity, a softswitch, a media gateway controller, a presence server, and an ENUM server.

19. The system of claim 15 wherein the first SIP entity is operable to determine one of availability and unavailability status information associated with the application or higher layer communications network signaling entity.

20. The system of claim 15 wherein the first SIP entity is operable to determine congestion status information associated with the application or higher layer communications network signaling entity.

21. The system of claim 15 wherein the first SIP entity is operable to maintain a list of peer network entities of the first SIP entity, and wherein the first SIP entity is operable to distribute the operational status information to the peer network entities in the list.

22. The system of claim 15 wherein the at least one SIP entity is operable to test communication with the application or higher layer communications network signaling entity in response to receiving the operational status information regarding the application or higher layer communications network signaling entity.

23. The system of claim 15 wherein the first SIP entity is operable to maintain a list of SIP entities subscribed to receive the operational status information for the application or higher layer communications network signaling entity and operable to identify the at least one second SIP entity using the list.

24. A system for distributing session initiation protocol (SIP) server operational status information, the system comprising:
 a plurality of SIP entities,
  wherein at least one of the SIP entities is operable to:
   determine operational status information regarding itself;
   maintain a list of other SIP entities of the plurality of SIP entities subscribed to receive operational status information determined by the at least one SIP entity regarding itself; and
   distribute the operational status information determined by the at least one SIP entity regarding itself to the other SIP entities using the list, wherein the SIP entities are associated with network nodes separate from subscriber communication terminals.

25. A computer readable medium having stored thereon computer executable instructions that when executed by the processor of a computer perform steps comprising:
 at a first session initiation protocol (SIP) entity separate from an application or higher layer communications network signaling entity with which the first SIP entity communicates:
  determining operational status information for the application or higher layer communications network signaling entity;
  identifying at least one second SIP entity to receive the operational status information; and
  distributing the operational status information to the at least one second network SIP entity, wherein the first entity, the at least one second SIP entity, and the application or higher layer communications network signaling entity are associated with network nodes separate from subscriber communication terminals.

* * * * *